United States Patent
Dizaji et al.

(10) Patent No.: US 7,151,483 B2
(45) Date of Patent: Dec. 19, 2006

(54) SYSTEM AND METHOD FOR CONCURRENT OPERATION OF MULTIPLE RADAR OR ACTIVE SONAR SYSTEMS ON A COMMON FREQUENCY

(75) Inventors: Reza M. Dizaji, Waterloo (CA); Richard R. McKerracher, Waterloo (CA); Anthony M. Ponsford, Waterloo (CA)

(73) Assignee: Raytheon Company, Waltham, MA (US)

( * ) Notice: Subject to any disclaimer, the term of this patent is extended or adjusted under 35 U.S.C. 154(b) by 87 days.

(21) Appl. No.: 11/051,402

(22) Filed: Feb. 4, 2005

(65) Prior Publication Data

US 2005/0242985 A1 Nov. 3, 2005

Related U.S. Application Data

(60) Provisional application No. 60/566,935, filed on May 3, 2004.

(51) Int. Cl.
*G01S 7/282* (2006.01)

(52) U.S. Cl. ............ 342/201; 342/202; 342/203; 342/204; 342/107; 342/108; 342/132; 342/134; 342/145

(58) Field of Classification Search ........ 342/200–204, 342/21, 107–116, 127–137, 139–141, 145, 342/146, 194, 195
See application file for complete search history.

(56) References Cited

U.S. PATENT DOCUMENTS 3,290,591 A * 12/1966 Byington ................. 324/76.35

| | | | |
|---|---|---|---|
| 3,731,310 A | 5/1973 | Rittenbach | |
| 4,338,604 A | 7/1982 | Petitjean | |
| 4,359,736 A | 11/1982 | Lewis | |
| 4,513,288 A | 4/1985 | Weathers et al. | |
| 6,405,147 B1 * | 6/2002 | Fera | 702/112 |
| 6,822,606 B1 * | 11/2004 | Ponsford et al. | 342/192 |
| 7,038,618 B1 * | 5/2006 | Budic | 342/195 |
| 2003/0025829 A1 | 2/2003 | Barrick et al. | |
| 2003/0063108 A1 * | 4/2003 | Isono et al. | 345/690 |
| 2004/0178951 A1 * | 9/2004 | Ponsford et al. | 342/192 |
| 2005/0242985 A1 * | 11/2005 | Ponsford et al. | 342/59 |

OTHER PUBLICATIONS

"Improvement in target detection performance of pulse coded Doppler radar based on multicarrier modulation with fast Fourier transform (FFT)", Prasad, N.N.S.S.R.K.; Shameem, V.; Desai, U.B.; Merchant, S.N. Radar, Sonar and Navigation, IEE Procs—vol. 151, Issue 1, Feb. 2004 pp. 11-17.*

(Continued)

*Primary Examiner*—John B. Sotomayor
(74) *Attorney, Agent, or Firm*—Daly, Crowley, Mofford & Durkee, LLP

(57) ABSTRACT

A system and corresponding method for the concurrent operation of multiple radar systems on a common frequency and in the same geographical area includes a waveform generator that specifies certain operating parameters for the transmitted radar pulses. In a first instance, the carrier frequency can include an offset for each radar system. In a second instance, complementary codes can be used for the radar pulses such that each radar system operates with a unique code for substantially reducing the cross-talk between the radar systems. In another instance, both carrier frequency offset and complementary coded waveforms can be used to increase the number of radar systems that operate concurrently. Carrier frequency offset can also be used to combat range-wrap by using different carrier frequencies for adjacent radar pulses.

35 Claims, 4 Drawing Sheets

OTHER PUBLICATIONS

"Noise radar using random phase and frequency modulation", Axelsson, S.R.J.Geoscience and Remote Sensing, IEEE Transactions on vol. 42, Issue 11, Nov. 2004 pp. 2370-2384.*

"High-speed, electronic arbitrary waveform generation using time-domain processing of ultrashort optical pulses", Saperstein, R.E.; Alic, N.; Rokitski, R.; Fainman, Y. LEOS Summer Topical Meetings, 2005 Digest of the Jul. 25-27, 2005 pp. 219-220.*

PCT Search Report of the ISA for PCT/US2005/014524 dated Oct. 31, 2005.

Written Opinion of the ISA for PCT/US2005/014524 dated Oct. 31, 2005.

Partial PCT Search Report received with invitation to Correct Pay Additional Fees in PCT/US2005/014524, dated Sep. 26, 2005.

Kretschmer et al.; "New Radar Pulse Compression Waveforms:" 1988 IEEE; 88 CH 2672-6/88/0000-0194; pp. 194-199..

* cited by examiner

SYSTEM AND METHOD FOR CONCURRENT OPERATION OF MULTIPLE RADAR OR ACTIVE SONAR SYSTEMS ON A COMMON FREQUENCY

CROSS-REFERENCE TO RELATED APPLICATION

This application claims the benefit of U.S. Provisional Application No. 60/566,935 filed on May 3, 2004 which application is hereby incorporated hereby by reference in its entirety.

FIELD OF THE INVENTION

The invention relates to concurrent operation of multiple radar or active sonar systems on a common frequency. More particularly, the invention relates to a system and method for the concurrent operation of multiple radar or active sonar systems on a common frequency.

BACKGROUND OF THE INVENTION

A phased-array radar includes a directional transmitting antenna and an receiving antenna array with omni-directional sensors that are both directed to a desired surveillance area, as well as the hardware and software needed for system operation. The transmitting antenna generates a train of electromagnetic (EM) pulses that illuminate the desired surveillance area. Objects in the surveillance area then reflect the EM pulses towards the receiving antenna array which collects radar data. Some of the objects may be elements that must be detected (the radar signatures from these elements are referred to as "targets") while the rest of the objects are elements that do not have to be detected (the radar signatures from these elements are referred to as "clutter" which is one type of noise in a radar system). More sophisticated pulse-coded or frequency-coded EM pulses may be used to combat range-wrap which occurs when a reflected EM pulse (in response to a previously transmitted EM pulse) is received by the receiving antenna array after subsequent EM pulses have been transmitted.

Conventionally, the collected radar data from each antenna element, or sensor, in the receiving antenna array is then preprocessed by passing the data through a bandpass filter to filter extraneous unwanted signals in the radar data, and then through a heterodyne receiver which demodulates the radar data from the RF band to an IF band (i.e. to provide IF radar data) where analog to digital conversion occurs. The radar data collected by the receiving antenna array is complex (i.e. has real and imaginary components). Accordingly, each of the signal processing components required to perform the above-mentioned operations are implemented to handle complex data.

The IF radar data is then demodulated to the baseband where it is low pass filtered for noise reduction and down-sampled for more efficient processing. The data is then processed by a matched filter that has a transfer function or impulse response that is related to the transmitted EM pulse. The matched filtered radar data is then separated into segments for analysis. Each segment is known in the art as a coherent integration time (CIT) or a dwell. The matched filtered radar data in each CIT is range-aligned by noting the time at which each data point was sampled relative to the time that a preceding EM pulse was transmitted. The output of this processing is a plurality of time series of range data where each time series is collected for a given range value. Beamforming and Doppler processing is then typically applied to provide processed radar data.

A target is detected from range, Doppler and azimuth information that is generated from the processed radar data. The range information is used to provide an estimate of the target's distance from the receiving antenna array. The azimuth information provides an estimate of the angle of the target's location with respect to the center of the receiving antenna array, and the Doppler information provides an estimate of the target's radial velocity by measuring the target's Doppler shift. The target's Doppler shift is related to the change in frequency content of the EM pulse that is reflected by the target with respect to the original frequency content of that EM pulse.

As mentioned previously, range data is generated by noting the time at which data is sampled relative to the time at which a preceding EM pulse is transmitted. Doppler processing corresponds to the detection of a sinusoidal signal of frequency $\Delta f$. Accordingly, Doppler information is generated for a given range value by subjecting the time series obtained for that range value for each pulse to filter bank processing or FFT processing. The azimuth data is conventionally obtained by digital beamforming. More specifically, the radar data at a given range cell and a given Doppler cell is weighted by a complex exponential for each antenna element of the receiving antenna array and then summed across all antenna elements. The phase of the complex exponential is related to the azimuth angle, the antenna element spacing and the wavelength of the transmitted EM pulses as is well known to those skilled in the art. Beamforming gives the appearance that the receiving antenna array is tuned to a certain region of the surveillance area defined by the azimuth value in the complex exponential weights. In this fashion, many beams may be formed to simultaneously cover the entire surveillance area.

To determine a target's range, azimuth and velocity, a detector processes the generated range, azimuth and Doppler information for a given CIT. In general, the detector looks for peaks at a given cell (i.e. a data value or pixel) in a two-dimensional plot known as a range-Doppler plot. Target detection usually comprises comparing the amplitude in a given cell with the average amplitude in neighboring cells. However, the detection process is hindered by the addition of noise, which includes the clutter previously mentioned, in each cell which may result in the missed detection of a target or the false detection of noise as a target. The noise is problematic since there will be a varying noise level in different cells as well as for radar data collected in different CITs, in different environmental conditions and at different locations.

The noise can also be due to the concurrent operation of more than one radar system on a common frequency. This situation arises when several radar systems are needed to monitor a given area. For instance, in the case of HFSWR, there may be a need to monitor the entire coastline of a country. Accordingly, several radar systems would be situated along the coastline. However, if each radar system transmits pulses on the same carrier frequency, which is currently the case, then the radar returns from a given radar system may be detected by another radar system. These "false returns" effectively appear as a new target at a different range, azimuth and Doppler frequency because the target will most likely be at a different distance and angle with respect to the two radar systems. The false returns are also expected to have a higher second order ocean clutter level as well as a higher skywave self-interference ionospheric clutter level since more transmitters are sending pulses towards the ocean and space, respectively. Accordingly, there is a need for radar systems that can generate radar waveforms such that two or more radar systems can operate at the same time without being affected by these false returns.

SUMMARY OF THE INVENTION

The inventors have realized that it is possible to have a network of radar systems operating concurrently on a common frequency and in the same geographical area by specifying certain operating parameters for the radar pulses that are transmitted. In a first instance, the inventors use the fact that the targets of interest have a Doppler range which is much less than the available Doppler band, set by the radar system's Pulse Repetition Frequency (PRF), to come up with a design to isolate radars by slightly changing the transmitted RF frequency. In this technique, the effective bandwidth occupied by the multiple radar systems stays the same. However, the targets and clutter illuminated by radar systems other than the radar system of interest will be shifted to a Doppler frequency that is outside of the Doppler frequency band in which targets for the radar system of interest exist. The carrier frequency that is used for the transmitted radar pulses can be shifted for each radar system such that the received radar data for each radar system, once demodulated and shifted to the baseband, is separated, in Doppler frequency, from radar data due to the operation of another radar system. In this case, the number of radar systems that can operate concurrently on a common frequency is related to the designated Doppler frequency band corresponding to the radar system's operational PRF, the Doppler bandwidth of the targets of interest for each radar system, and a guard band interval that is needed to reduce crosstalk between the radar systems.

In a second instance, the inventors have found that it is possible to design a set of coded waveforms for the transmitted pulses such that each radar system operates with a unique code thereby allowing for the concurrent operation of several radar systems on a common frequency. This allows the cross-talk between the radar systems to be substantially reduced. The coded waveforms are chosen such that the coded waveforms for a given radar system are orthogonal to the coded waveforms used for the other radar systems. In this case, the number of radar systems that can operate concurrently depends on the number of codes that can provide this orthogonal property. The general class of coded waveforms that can be used are known as complementary coded waveforms. In one embodiment, Frank codes are used. However, any family of codes that are orthogonal to each other can be used as long as the code length is such that the minimum range requirement of the radar system is satisfied.

For a single radar system, the use of complementary codes avoids the range wrap effect (see U.S. patent application Ser. No. 10/384,203). For multiple radar systems, this range wrap advantage is maintained for each radar system through carefully choosing a set of complementary codes for each radar system such that either the cross correlations of each code or shifted versions of the codes (corresponding to the order of range wrap) are close to zero for each code in the set of complementary codes.

In another instance, the inventors have found that it is possible to combine both carrier frequency offset and orthogonal coded waveforms to increase the number of radar systems that operate concurrently on a common frequency. In this case, given that N unique carrier frequencies and that M orthogonal coded waveforms can be used, the number of radar systems that can operate concurrently on a common frequency using both carrier frequency offset and orthogonal coded waveforms is N×M.

The inventors have also found that it is possible to use carrier frequency offset to combat range-wrap. In this case, adjacent pulses in time are transmitted with carrier frequencies that are offset from one another in frequency so that the radar data associated with these radar pulses are independent from one another in Doppler frequency and a filtering operation can be used to identify the radar data of interest. The radar pulses can be coded or uncoded. If coded pulses are used, then complementary codes can be used, as described above, to also allow for the concurrent operation of multiple radar systems on a common frequency.

In accordance with a first aspect, the invention provides a waveform generator for a radar system. The waveform generator is adapted to allow the radar system to operate concurrently on a common frequency with at least one other radar system. The waveform generator comprises a radar parameter unit that includes an operating parameters module for generating operating parameters for radar pulses that are transmitted by the radar system; and, a carrier frequency parameter module connected to the operating parameters module for generating a carrier frequency at which the radar pulses are transmitted. The carrier frequency includes a carrier frequency offset with respect to carrier frequencies used by the at least one other radar system. The waveform generator further includes a signal generator connected to the radar parameter unit for generating the radar coded waveform in accordance with the operating parameters; and, a timing unit connected to the signal generator for supplying a pulse trigger signal to the signal generator for generating the radar pulses such that the radar system is synchronized with the at least one other radar system.

In accordance with a second aspect, the invention provides a waveform generator for a radar system. The waveform generator is adapted to allow the radar system to operate concurrently on a common frequency with at least one other radar system. The waveform generator comprises a radar parameter unit including an operating parameters module for generating operating parameters for radar pulses that are transmitted by the radar system; and, a code generator module connected to the operating parameters module for providing at least one complementary code that is used to generate the radar pulses. The at least one complementary code is orthogonal to complementary codes used by the at least one other radar system. The waveform generator further includes a signal generator connected to the radar parameter unit for generating the radar pulses in accordance with the operating parameters; and, a timing unit connected to the signal generator for supplying a pulse trigger signal to the signal generator for generating the radar pulses such that the radar system is synchronized with the at least one other radar system.

In accordance with another aspect, the invention provides a waveform generator for a radar system. The waveform generator is adapted to allow the radar system to operate concurrently on a common frequency with at least one other radar system. The waveform generator comprises a radar parameter unit including an operating parameters module for generating operating parameters for radar pulses that are transmitted by the radar system; a carrier frequency parameter module connected to the operating parameters module for generating a carrier frequency at which the radar pulses are transmitted, the carrier frequency including a carrier frequency offset with respect to carrier frequencies used by the at least one other radar system; and, a code generator module connected to the operating parameters module for providing at least one complementary code that is used to generate the radar pulses, the at least one complementary code being orthogonal to complementary codes used by the at least one other radar system. The waveform generator further includes a signal generator connected to the radar parameter unit for generating the radar pulses in accordance with the operating parameters; and, a timing unit connected to the signal generator for supplying a pulse trigger signal to the signal generator for generating the radar pulses such that the radar system is synchronized with the at least one other radar system.

In accordance with another aspect, the invention provides a waveform generator for a radar system, the waveform generator being adapted to combat range wrap. The waveform generator comprises a radar parameter unit including an operating parameters module for generating operating parameters for radar pulses that are transmitted by the radar system; and, a carrier frequency parameter module connected to the operating parameters module for generating a set of carrier frequencies at which the radar pulses are transmitted, the set of carrier frequencies including unique carrier frequencies each having a carrier frequency offset with respect to one another. The waveform generator further includes a signal generator connected to the radar parameter unit for generating radar pulses in accordance with the operating parameters with adjacent radar pulses being given a unique carrier frequency from the set of carrier frequencies; and, a timing unit connected to the signal generator for supplying a pulse trigger signal to the signal generator for generating the radar pulses.

In accordance with another aspect, the invention provides a method for generating radar pulses for a radar system for allowing the radar system to operate concurrently on a common frequency with at least one other radar system. The method comprises:

a) generating operating parameters for radar pulses that are transmitted by the radar system, the operating parameters including a carrier frequency at which the radar pulses are transmitted, the carrier frequency including a carrier frequency offset with respect to carrier frequencies used by the at least one other radar system;

b) generating a pulse trigger signal for synchronizing the radar system with the at least one other radar system; and, c) generating the radar pulses in accordance with the operating parameters and the synchronization provided by the pulse trigger signal.

In another aspect, the invention provides a method for generating radar pulses for a radar system for allowing the radar system to operate concurrently on a common frequency with at least one other radar system. The method comprises:

a) generating operating parameters for radar pulses that are transmitted by the radar system;

b) generating at least one complementary code that is used to generate the radar pulses, the at least one complementary code being orthogonal to complementary codes used by the at least one other radar system;

c) generating a pulse trigger signal for synchronizing the radar system with the at least one other radar system; and, d) generating the radar pulses in accordance with the operating parameters and the synchronization provided by the pulse trigger signal.

In another aspect, the invention provides a method for generating radar pulses for a radar system for allowing the radar system to operate concurrently on a common frequency with at least one other radar system. The method comprises:

a) generating operating parameters for radar pulses that are transmitted by the radar system, the operating parameters including a carrier frequency at which the radar pulses are transmitted, the carrier frequency including a carrier frequency offset with respect to carrier frequencies used by the at least one other radar system;

b) generating at least one complementary code that is used to generate the radar pulses, the at least one complementary code being orthogonal to complementary codes used by the at least one other radar system;

c) generating a pulse trigger signal for synchronizing the radar system with the at least one other radar system; and, d) generating the radar pulses in accordance with the operating parameters and the synchronization provided by the pulse trigger signal.

In another aspect, the invention provides a method of generating radar pulses for a radar system, the radar pulses being adapted to combat range wrap. The method comprises:

a) generating operating parameters for the radar pulses that are transmitted by the radar system, the operating parameters including a set of carrier frequencies at which the radar pulses are transmitted, the set of carrier frequencies including unique carrier frequencies each having a carrier frequency offset with respect to one another, with adjacent radar pulses being given a unique carrier frequency from the set of carrier frequencies;

b) generating a pulse trigger signal for synchronizing the radar system with the at least one other radar system; and, c) generating the radar pulses in accordance with the operating parameters and the synchronization provided by the pulse trigger signal.

BRIEF DESCRIPTION OF THE DRAWINGS

For a better understanding of the invention and to show more clearly how it may be carried into effect, reference will now be made, by way of example only, to the accompanying drawings which show an exemplary embodiment of the invention and in which:

FIG. 2b is a Doppler plot corresponding to the situation depicted in FIG. 2a;

DETAILED DESCRIPTION OF THE INVENTION

Figure 1:
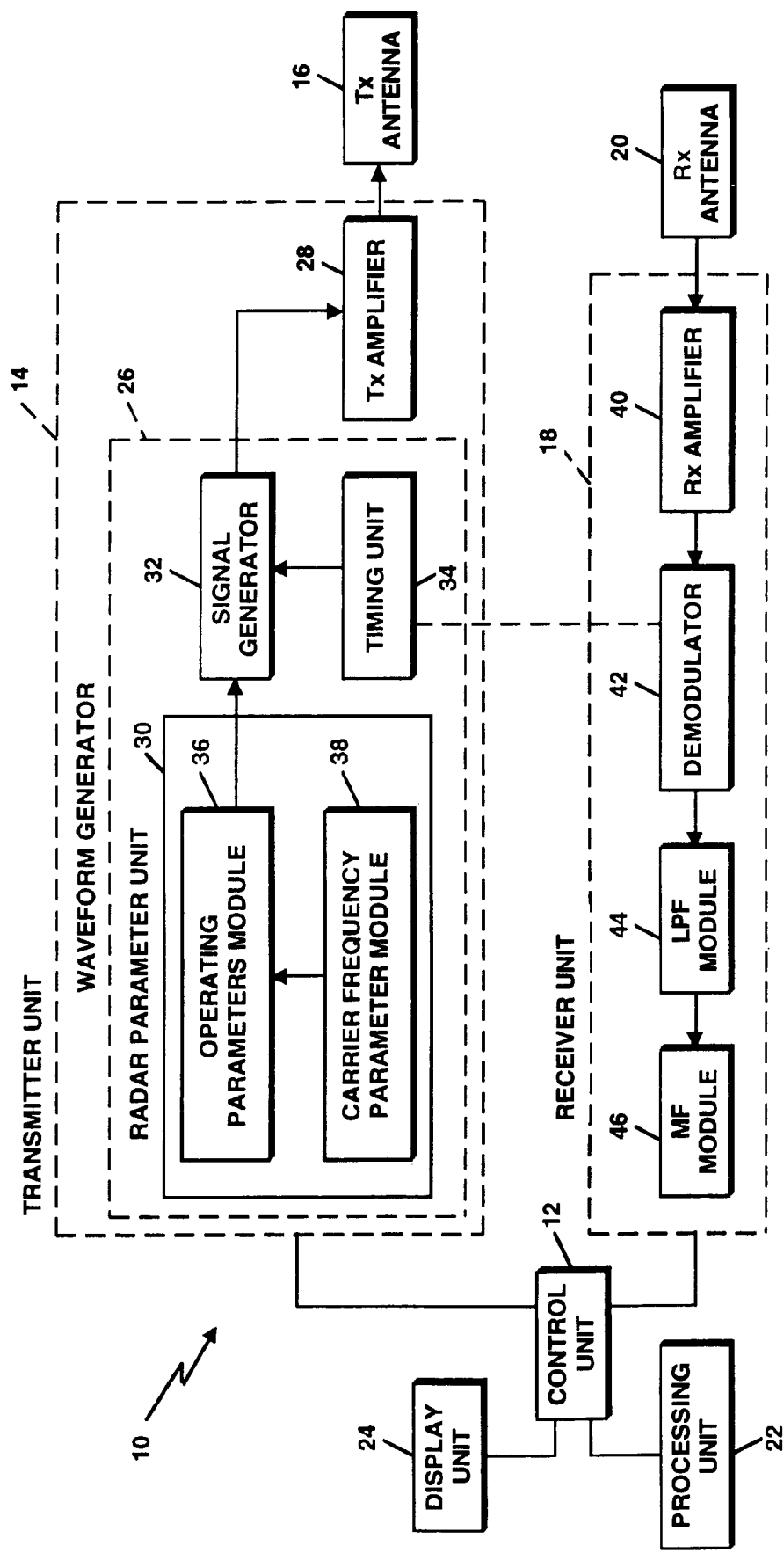
FIG. 1 is an exemplary block diagram of a first embodiment of a radar system having a waveform generator that allows for concurrent operation with another radar system on a common frequency in accordance with the invention.

In the following detailed description, numerous specific details are set forth in order to provide a thorough understanding of the invention. However, it will be understood by those of ordinary skill in the art that the invention may be practiced without these specific details. In other instances, well-known methods, procedures and components have not been described in detail so as not to obscure the invention. Further, other hardware and software configurations can be used as is well known to those skilled in the art without departing from the invention. In addition, where considered appropriate, reference numerals may be repeated among the figures to indicate corresponding or analogous elements. It should be understood that the invention can also be applied to active sonar systems. However, for simplicity, the invention will be described for a network of radar systems.

Referring now to FIG. 1, shown therein is a block diagram of a radar system 10 having a waveform generator that allows for concurrent operation with another radar system on a common frequency in accordance with the invention. The radar system comprises a control unit 12 that is connected to a transmitter unit 14 having a transmitter antenna 16 and a receiver unit 18 having a receiver antenna 20. The control unit 12 is also connected to a processing unit 22 and a display unit 24. The control unit 12 is connected to each of these components via a data bus such as a VME bus for example; other suitable data buses may be used. In some cases, some of the components may be implemented by the same means; for instance, the control unit 12 and the processing unit 22 may be implemented by a single digital signal processor.

The control unit 12 controls and synchronizes the operation of the radar system 10 for individual operation and for network operation with at least one other radar system operating concurrently on a common frequency (network operation is discussed in more detail below). In particular, for individual operation, the control unit 10 coordinates the operation of the transmitter unit 14 and the receiver unit 18. The control unit 12 sends control signals to the transmitter unit 14 for generating and transmitting radar pulses. The control unit 12 also sends control signals to the receiver unit 18 for receiving reflected radar signals in response to the transmitted radar pulses and for pre-processing the reflected radar signals to provide radar data. The control unit 12 then directs the processing unit 22 to further process the radar data to provide radar-related information such as detection and tracking data. The control unit 12 then sends the radar-related information and the radar data to the display unit 24 for visual display. There may also be other output means such as a printer for obtaining a hardcopy of the data.

The antennas 16 and 20 can be any antenna that is suitable for transmitting and receiving radar signals. Many variations exist for the antennas 16 and 20. For instance, at least one of the antennas 16 and 20 may comprise an array of antenna elements. In another variation, the antennas 16 and 20 may be the same physical antenna and the radar system 10 has a switching element, such as a duplexer, that is connected between the transmitter unit 14 and the receiver unit 18. As is known to those skilled in the art, the duplexer connects the antenna to the transmitter unit 14 during the transmission of radar pulses and connects the antenna to the receiver unit 18 for the reception of returned radar signals.

The transmitter unit 14 includes a waveform generator 26 for generating the radar pulses and a transmitter amplifier 28 for amplifying the radar pulses to a suitable power level for transmission across a desired surveillance region. The transmitter amplifier 28 provides the amplified radar pulses to the transmitter antenna 16 for transmission.

The waveform generator 26 includes a radar parameter unit 30, a signal generator 32 and a timing unit 34. The radar parameter unit 30 generates values for various operating transmission parameters for the radar system 10. These parameters include pulse repetition frequency (PRF), duty cycle, whether the pulses are coded and whether the codes are phase or frequency based, the carrier frequency used for transmitting the radar pulses, as well as other parameters that are well known to those skilled in the art. Accordingly, the radar parameter unit 30 includes an operating parameters module 36 and a carrier frequency parameter module 38 for providing values for these various parameters. The carrier frequency parameter module 38 is discussed in further detail below.

The signal generator 32 is used to generate the radar pulses in accordance with the operating transmission parameters provided by the radar parameter unit 30. The signal generator 32 includes several components for signal generation as is commonly known by those skilled in the art. In this exemplary embodiment, the signal generator 32 can include a complex modulator for generating I and Q components for the radar pulses (this is the most general representation, assuming that complex data is used to generate the radar pulses). A look-up table may be used to provide the complex data that is used by the complex modulator. Another input to the complex modulator is an intermediate frequency that is used for complex modulation. In particular, the intermediate frequency generally includes a frequency offset that is generated by the carrier frequency parameter module 38 in accordance with the invention (this is discussed in more detail below). The signal generator 32 further includes mixing elements for translating the radar pulses to the desired transmission frequency, which for HFSWR radar is in the range of 3–6 MHz. The transmission frequency can be adjusted in very fine increments, such as 10–15 Hz for example. The mixing elements may be implemented in any fashion; one example is to use a two-stage heterodyne mixer in which the radar pulses are up-converted to a very high frequency, such as 50 MHz for example, where further processing is performed such as filtering to remove unwanted signal components that are generated after modulation in order to provide a pure complex sinusoidal waveform, and then down-converted to the transmission frequency of approximately 3 to 6 MHZ, for the HFSWR case. Other frequency ranges may be used for other types of radar systems. The signal generator 32 may also include means for shaping the envelope of the pulses such as tapering the leading, trailing or both the leading and trailing edges of the generated pulses. The signal generator 32 further includes a digital-to-analog converter for converting the radar pulses to an analog signal which is then amplified by the transmitter amplifier 28.

The timing unit 34 provides a pulse trigger signal to the signal generator 32 for generating the radar pulses for transmission. The signal generator 32 can use the pulse trigger signal to generate a gating waveform that is used to bias the transmitter amplifier 28 during the time periods in which radar pulses are transmitted. In this fashion, the receiver unit 18 is synchronized with the transmitter unit 14 and is turned off to avoid a direct pulse from the transmitter unit 14 to the receiver unit 18. The direct pulse will saturate, and possibly damage, the receiver unit 18. While this may be more applicable to mono-static radar systems, it is not mean to limit the invention in the case of a bi-static radar system.

The timing unit 34 also provides synchronization between the radar system 10 and the other radar systems that are operating concurrently on a common frequency. Accordingly, each radar system in the radar system network transmits radar pulses at the same time. The synchronization of transmitted radar pulses helps to mitigate the possibility of a direct pulse saturating the receiver unit of any of the radar systems. The synchronization of transmitted radar pulses is also advantageous for implementing the concurrent operation of the multiple radar systems on a common frequency as will be described further below. Any clock standard can be used for this synchronization. For example, a GPS clock may be used.

The receiver unit 18 includes a receiver amplifier 40, a demodulator 42, a Low Pass Filter (LPF) module 44 and a matched filter (MF) module 46 connected as shown in FIG. 1. The receiver amplifier 40 receives reflected radar pulses that are sensed by the receiver antenna 20. The receiver amplifier 40 then amplifies these received reflected pulses and provides the amplified received reflected pulses to the demodulator 42. The demodulator 42 includes an analog-to-digital converter for converting the amplified received reflected pulses to digital radar data. The demodulator 42 further includes filtering elements, such as a band pass filter, for removing noise from the digital radar data. Other noise reduction modules may also be used as is commonly known to those skilled in the art. The demodulator 42 further includes mixing elements for translating the digital radar data to the baseband for further processing. The mixing elements may be implemented in any fashion; one example is to use a two-stage heterodyne mixer in which the radar pulses are down-converted to an IF frequency, such as 300 kHz for example, where further processing may be performed such as matched filtering at the intermediate frequency rather than at baseband, and then down-converted to the baseband.

The baseband radar data is then provided to the LPF module 44 where further filtering is applied for noise reduction. The filtered baseband radar data is then provided to the MF module 46 which match filters the filtered baseband data to provide matched-filtered radar data. Matched filtering provides further noise reduction and combats range wrap. The MF module 46 is preferably a digital filter with a transfer function that is matched to the transmitted radar pulses (i.e. the transfer function of the matched filter only has the same frequency components; i.e. phase and amplitude as those contained in the transmitted radar pulses). Assuming that the receiver antenna 20 comprises an array of sensor elements, the filtered baseband radar data can be considered to be a three-dimensional data set in which the three dimensions represent pulse, range and sensor data. The filtered baseband radar data can be arranged as a cube with the range dimension extending vertically on the face of the cube, the pulse dimension extending horizontally on the face of the cube and the sensor data extending along the depth of the cube. This data can be referred to as range-pulse-sensor radar data. Accordingly, the MF module 46 may comprise a single digital filter that operates along the range dimension for a given pulse index and a given sensor (i.e. the matched filter operates on range vectors). This match filtering operation is performed for each pulse index and each sensor. The match filtering may be done in a sequential manner such that the transfer function of the matched filter is changed depending on the pulse return being processed (i.e. matched to the transmitted radar pulse that corresponds to the current pulse return). Alternatively, the matched filter module 16 may comprise a bank of digital filters, each having a transfer function matched to one of the transmitted radar pulses. The receiver unit 18 would then switch the incoming filtered baseband data to the corresponding matched filter. Alternatively, in this implementation, the incoming filtered baseband data can be filtered in parallel.

The control unit 12 then provides the matched-filtered radar data to the processing unit 22 which processes the matched-filtered radar data to detect targets using processing methods that are well known to those skilled in the art. For instance, using the three-dimensional data example above, the processing unit 22 can include a Doppler processing module for converting the range-pulse-sensor data to range-Doppler-sensor data by performing an FFT on the rows of the range-pulse-sensor data in the pulse domain. The processing unit 22 can also include an Azimuth processing module for converting the range-Doppler-sensor data to range-Doppler-Azimuth data by performing an FFT on the rows of the range-Doppler-sensor data along the sensor domain for a given Doppler index and range index. Alternatively, the processing unit 22 can include a beamforming module to produce the Azimuth data. The processing unit 22 can also include noise reduction modules for removing noise from the matched-filtered baseband radar data. These operations are well known to those skilled in the art and will not be further described. It should be understood that each element of the invention allow for processing data that may be complex (i.e. the data has real and imaginary parts).

The processing unit 22 can also include a detection module and a tracking module (both not shown). The detection module processes the range-Doppler-Azimuth data to detect targets and provide detection data. The tacking module then tracks the detected targets and provides track data. Both the detection module and the tracking module can be implemented using methods that are well-known to those skilled in the art. The control unit 12 can combine the detection data, the track data and the range-Doppler-Azimuth data for display in whole or in part on the display unit 24. Other representations of the range-Doppler-Azimuth data may be used such as the corresponding range-Doppler-Sensor data, and the like.

Figure 2B:
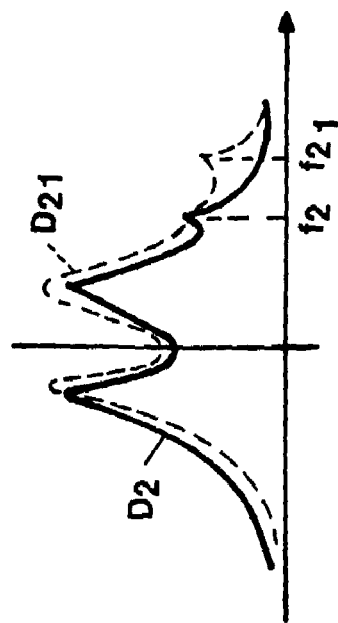
Figure 2C:
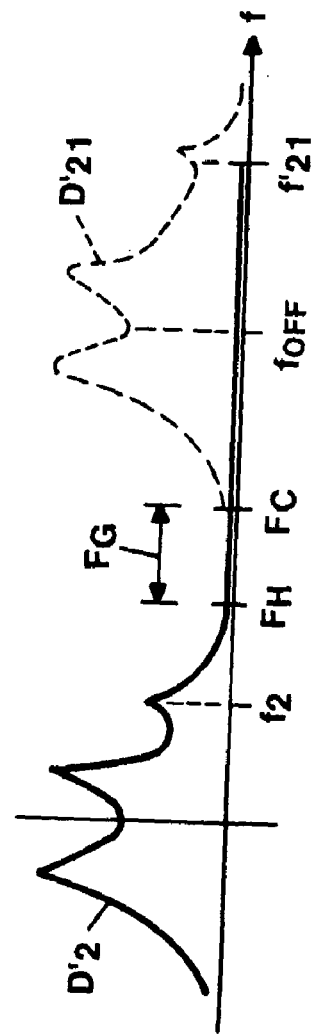
FIG. 2c is a Doppler plot illustrating the benefit of using carrier frequency offset for radar systems that operate concurrently on a common frequency.
Figure 2A:
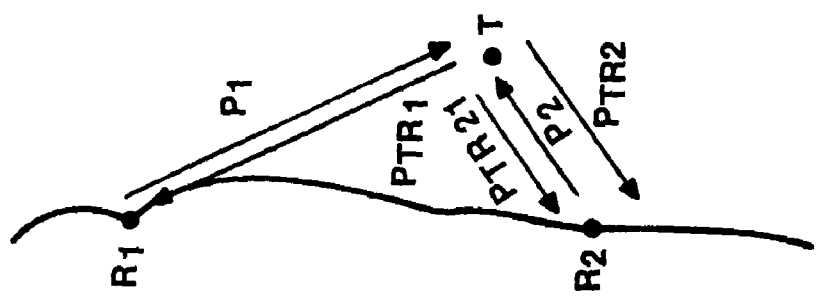
FIG. 2a is an illustration of two radar systems operating concurrently on a common frequency in a conventional fashion.

Referring now to FIG. 2a, shown therein is an illustration of two radar systems $R_1$ and $R_2$ operating concurrently on a common frequency in a conventional fashion. In this example, the radar systems $R_1$ and $R_2$ are HFSWR systems that are situated along a coastline and there is a target T that is situated off of the coast. The two radar systems $R_1$ and $R_2$ may be separated by a few hundred kilometers. Since the range of an HFSWR system has a radius of approximately 500 km, the radar systems $R_1$ and $R_2$ will interfere with each other. For example, the radar system $R_1$ sends out a pulse $P_1$ that reflects off of the target T and propagates back towards the radar system $R_1$ as reflected pulse $P_{TR1}$. The radar system $R_2$ sends out a pulse $P_2$ that reflects off of the target T and propagates back towards the radar system $R_2$ as reflected pulse $P_{TR2}$. However, there is cross-talk between the two radar systems $R_1$ and $R_2$. The cross-talk consists of reflected pulses from the target T due to the transmitted pulses $P_1$ and $P_2$ that propagate towards radar systems $R_2$ and $R_1$ respectively (i.e. the reflected pulses propagate towards the radar system which did not send out the initial pulse). This is shown only for reflected pulse $P_{TR12}$ in FIG. 2a for ease of illustration. The reflected pulse $P_{TR21}$ is the pulse that reflects from the target T to the radar system $R_2$ due to the initial pulse $P_1$ that was sent to the target T from the radar system $R_1$. The target T will appear as a false target for the radar system $R_2$ at a different range, azimuth and Doppler than the true range, azimuth and Doppler, with respect to radar system $R_2$, because of the different path length of the pulse $P_1$ to the target $T_1$ and the reflected pulse $P_{TR21}$ to the radar system $R_2$ compared to the path length of the pulse $P_2$ to the target $T_2$ and the reflected pulse $P_{TR2}$ to the radar system $R_2$.

Referring now to FIG. 2b, shown therein are two Doppler plots $D_2$ and $D_1$ for the radar system $R_2$ corresponding to the situation depicted in FIG. 2a. The Doppler plot $D_2$ is the Doppler plot associated with the radar system $R_2$ that would exist if the radar system $R_1$ was not transmitting radar pulses at the same carrier frequency. In the Doppler plot $D_2$, the Doppler frequency of the target T is correctly seen at frequency $f_2$. However, the cross-talk from the radar system $R_1$ is seen as Doppler plot $D_{21}$ shown in dotted lines. The Doppler plot $D_{21}$ indicates a false target at Doppler frequency $f_{21}$. In this case, the actual Doppler plot for radar system $R_2$ is a combination of the Doppler plots $D_2$ and $D_{21}$. Accordingly, it would appear as if there is another target with a Doppler frequency $f_{21}$ due to the cross-talk between the radar systems $R_1$ and $R_2$.

The inventors have found that it is possible to have two or more radar systems operating in a concurrent fashion on a common frequency by carefully selecting one or more operational parameters that are used for generating the transmitted radar pulses. For this purpose, the radar system 10 includes the carrier frequency parameter module 38 which selects the carrier frequency that is used for transmitting the radar pulses. The carrier frequency parameter module 38 selects the carrier frequency based on the number of radar systems that are operating concurrently on a common frequency, the Doppler bandwidth of the baseband radar data (related to the PRF of multiple radar system), the distance of the nearest radar systems and the carrier frequencies that are being used by those radar systems. Rather than generating a carrier frequency having the same carrier frequency $f_c$ of another radar system, the carrier frequency parameter module 38 generates a carrier frequency having a frequency of $f_c + f_{off}$, i.e. the carrier frequency has a slight frequency offset of $f_{off}$ with typical values in order of 10 to 20 Hertz, although other frequencies can be used, with regards to another radar system that operates at a carrier frequency $f_c$. This has an effect of Doppler frequency shifting the radar data having false reflections due to concurrent operation of another radar system on a common frequency with respect to the true radar data for a given radar system of interest. Filtering in the Doppler domain can then be used to remove the false reflections. It should be noted that in this implementation of the invention, the timing unit 34 provides synchronization between the multiple radar systems so that a direct pulse event is avoided. Further, the timing unit 34 provides synchronization for the phase and frequency of the pulses that are transmitted by different radar systems in the radar systems network. This ensures that there is no random phase or random frequency shifts due to multiple transmitter operations other than those that are intended.

Referring now to FIG. 2c, shown therein is a Doppler plot for two augmented radar systems $R'_1$ and $R'_2$, having carrier frequency parameter modules 38, that generate unique carrier frequencies. The Doppler plot has two radar data portions, a first radar data portion $D'_2$ due to the operation of radar system $R'_2$ and a second radar data portion $D'_{21}$ due to the cross-talk from radar system $R'_1$. However, the two radar data portions $D'_2$ and $D'_{21}$ are offset in frequency by a frequency offset $f_{off}$. In particular, the radar data portion $D'_2$ is centered at DC, and the radar data portion $D'_{21}$ is centered about the frequency $f_{off}$. Accordingly, the two radar data portions $D'_2$ and $D'_{21}$ are easily separable and the Doppler frequency $f_2$ of the true target T is seen while the Doppler frequency $f'_{21}$ of the false target can be ignored. This radar data portion may be removed by low pass filtering which occurs after matched filtering. This filtering may be done by a low-pass filter module that is situated after the MF module 46. Alternatively, the filtering may be done in the processing unit 22. The radar data of the radar system of interest, which is radar system $R_2$ in this example, is always centered at baseband since the receiver unit 18 is tuned to the carrier frequency $f_c$. This concept relies on the fact that the radar targets of interest have Doppler frequencies that are much smaller than the radar system's PRF and typically targets do not exist beyond 20–25 Hz in the Doppler frequency band, since, for example, for a 3 MHz RF frequency, a target with 20 Hz Doppler frequency has a speed of around 1000 m/s. Moreover, for HFSWR, the ocean and ionospheric clutter are not present beyond a Doppler frequency of approximately 15–20 Hz.

FIG. 2c shows that the frequency offset $f_{off}$ is chosen such that the maximum Doppler frequency $F_H$ of radar data portion $D'_2$ is less than the minimum Doppler frequency $F_L$ of radar data portion $D'_{21}$. Preferably, the frequency offset $f_{off}$ is selected such that there is a guard band $F_G$ between the two radar data portions $D'_2$ and $D'_{21}$. The size of the guard band $F_G$ depends on the amount of cross-talk that is experienced (in this case, this can be seen by the side-lobes of the adjacent radar data portions). In general, the further that the radar system $R_1$ is from the radar system $R_2$, the smaller the amount of the cross-talk and the smaller the size of the required guard band $F_G$. It should be understood that the number of radar systems that can operate in parallel depends on the frequency band that is allocated for this particular type of radar operation, the Doppler bandwidth of the baseband radar data and the size of the guard bands. The size of the guard bands depends on the distance of the radar systems with respect to one another and the power of the transmitted radar pulses. As an example, for a network of HFSWR radar systems, the frequency bandwidth for operation is approximately 20 kHz, the Doppler bandwidth is approximately +/−12 Hz and a guard band of 5 Hz can be used. An HFSWR radar system may operate at a carrier frequency of 3.3 MHz with a PRF of 250 Hz and a frequency offset of 20 Hz. Accordingly, in this example, there can be up to 6 HFSWR radar systems that can operate concurrently on a common frequency. If slow moving targets are desired, low pass filtering can be used and by decreasing the Doppler bandwidth, the number of concurrent radar systems that operate on a common frequency can be increased. In addition, or in an alternative, the PRF may be increased.

In general, any type of pulse may be used in radar system 10 for the transmitted radar pulses. However, it is preferable to use complementary codes for the transmitted radar pulses to combat range-wrap. Range-wrap occurs when a reflected EM pulse (in response to a previously transmitted EM pulse) is received by the receiver antenna 20 after subsequent EM pulses have been transmitted. In this case, the target can appear at an incorrect range since the range is calculated based on the reception time of the reflected pulse with respect to the previously transmitted radar pulse.

The complementary codes that are used for generating the transmitted radar pulses are preferably designed utilizing Frank codes (Frank R. L., IEEE Trans. On IT, Vol. 9, pp. 43–45, 1963). The Frank codes are also used to generate the filter coefficients for the MF module 46. Frank codes are used to phase modulate each generated radar pulse as is well known to those skilled in the art. In this case, a given radar pulse is referred to as a code having components which each have a phase in accordance with a Frank code obtained from a Frank code matrix. The generated radar pulses are all orthogonal to each other since the rows of a Frank code matrix are orthogonal. An example of a P4 Frank matrix is P4=[1 1 1 1; 1 j –1 j; 1 –1 1 –1; 1 –j –1 j] where the rows of the matrix are separated by a semicolon. Accordingly a radar pulse based on the fourth row of the Frank P4 matrix, for example, has four sinusoidal components having phases of 0°, 270°, 180° and 90° respectively. Furthermore, the coefficients of a matched filter that is matched to this radar pulse has the same samples as the generated radar pulse that are complex conjugated and in reversed order. This may be repeated for each row of the Frank P4 matrix so that there are 4 distinct radar pulses and 4 distinct matched filters. These four distinct radar pulses can be repeatedly transmitted in a sequential fashion such as TRP1, TRP2, TRP3 and TRP4 (where TRP stands for Transmitted Radar Pulse and each number represents a row in the P4 matrix). The radar returns are then processed by the corresponding matched filter. The radar output is obtained after the summation of the corresponding matched filter outputs. It is shown (Frank, 1993), that any code sequence other than the transmitted code sequence shows a value close to zero at the output of the corresponding summation block, while for the same code sequence, the output of the summation block gives a perfect peak with close to zero sidelobe levels. This is independent of frequency as long as the transmitted code and the received code share the same frequency band.

Other Frank codes based on a P8, P16 or a P32 matrix may also be used. However, in the case of a P32 matrix, the phases required for phase modulation would need to be precisely generated since the phases are much closer together and are subject to system environmental noise. Therefore, higher order Frank codes require more precise hardware and data processing. Other codes, such as Barker codes, may be used given different requirements such as the bandwidth of the transmitted pulses.

The inventors have found that complementary codes, which are conventionally used to combat range-wrap as just described, can also be used to allow for the concurrent operation of multiple radar systems on a common frequency in a radar systems network. Using the exemplary radar system network shown in FIG. 2a, both radar systems can use complementary codes for generating the transmitted pulses. However, radar system $R_2$ uses complementary codes that are orthogonal to the complementary codes used by radar system $R_1$. The MF module 46 of radar system $R_2$ is then matched to the complementary codes used by the radar system $R_2$ and only allows radar data due to the reflection of pulses transmitted by radar system $R_2$ since radar data due to the reflection of pulses transmitted by radar system $R_1$ are filtered out by the MF module 46.

Figure 3:
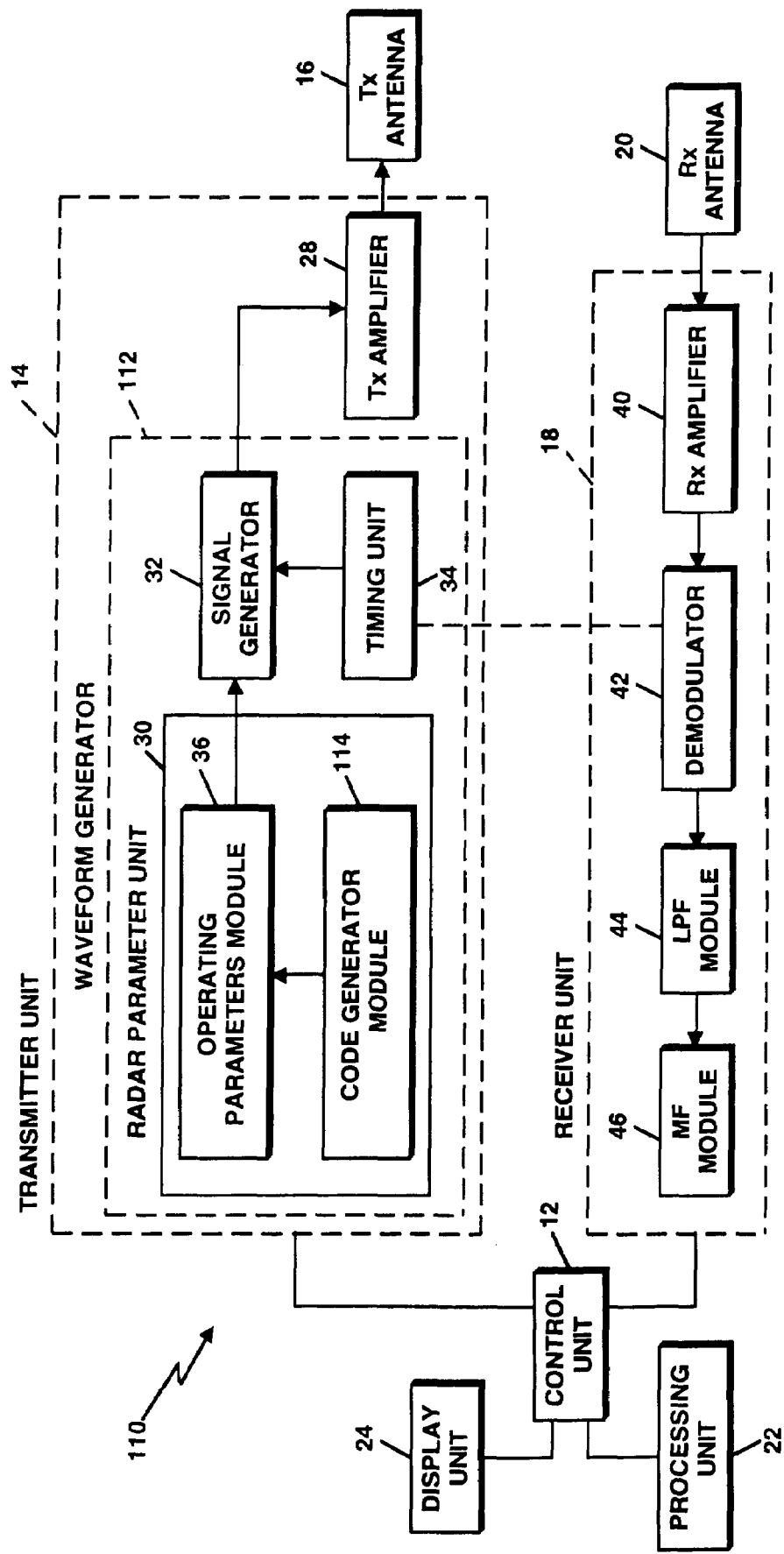
FIG. 3 is an exemplary block diagram of another embodiment of a radar system having a waveform generator that allows for concurrent operation with another radar system on a common frequency in accordance with the invention; and, FIG. 4 is an exemplary block diagram of another embodiment of a radar system having a waveform generator that allows for concurrent operation with another radar system on a common frequency in accordance with the invention.

Referring now to FIG. 3, shown therein is an exemplary block diagram of a radar system 110 having a waveform generator 112 that allows for concurrent operation with another radar system on a common frequency in accordance with the invention. In this embodiment, the waveform generator 112 includes a code generator module 114 that generates a unique set of complementary codes. The remainder of the components of the radar system 110 are similar to those of radar system 10 and will not be discussed. In this embodiment, the radar systems in the radar system network can transmit on the same carrier frequency.

The code generator module 114 selects complementary codes that have the least amount of cross-correlation with the complementary codes that are used by other radar systems in the radar system network. However, the complementary codes can also be selected due to other requirements such as the maximum allowable frequency range of operation for the radar system network as well as the minimum range for which detection is desired for a particular radar system (the radar system 110 can only start "listening" for reflections once it has transmitted a pulse which depends on the pulse duration, i.e. the length of the complementary code). The selected complementary code(s) should also satisfy a required range sidelobe level, since due to restricted transmission bandwidth, the complementary codes are smoothed by cosine windows. This smoothing weakens the cross-correlation feature of complementary codes and increases the range side lobe level. In cases where the complementary codes are over-smoothed, an important condition of determining the set of complementary codes is to use range sidelobe level after pulse compression. The complementary codes are also preferably determined such that the cross-correlations of shifted codes (due to range wrap) are minimal. Another parameter that can be used is the cross-correlation level of incoming complementary codes at the output of individual mismatched filters that are used for external interference reduction. This level may also be be minimized so as not to distrurb any noise cancellaltion algorithms that are being used, such as an external interference cancellation algorithm as described in patent application Ser. No. 10/384,203. Oversmoothing the complementary codes also has some effects on this level.

In addition, the selected complementary codes should also satisfy the requirement of minimizing the range wrap content of each radar induced by either its own code or by other radar systems in the radar systems network. In this case, the radar system 110 uses a set of complementary codes to allow for the concurrent operation of the radar systems on a common frequency as well as to combat range-wrap. However, the set of complementary codes used by one radar system in the radar network system must be unique, in the sense of having very low cross-correlation, with respect to the complementary codes used by the rest of the radar systems in the radar systems network. Nonetheless, the number of combinations that can be used to form complementary codes is quite large for complementary codes having a reasonable number of components. For example, for a complementary coded waveform with length 8, there are 8! combinations of waveforms. However, not all of the combinations result in the best choices for concurrent radar system operation on a common frequency (i.e. not all pairs of codes will produce a cross-correlation of nearly zero). The length of a code can be increased to increase the number of code combinations. However, the minimum range decreases when the code length increases if the radar bandwidth stays constant. Further, the phase values between different codes decrease for longer length codes which means that the codes are more susceptible to noise. Accordingly, in this implementation of the invention, the timing unit 34 provides synchronization between the multiple radar systems so that the coded transmitted radar pulses are aligned in terms of the phase transitions in the codes such that the cross-correlation of orthogonal codes is nearly zero.

Any complementary code sets can be used including Hadamard codes that can give an autocorrelation function with zero sidelobe level. In addition, Barker codes may be used but this should be done in conjunction with using carrier frequency offset. Some of these complementary codes may not provide range wrap protection. However, it is possible to derive a set of codes from any complementary code sets with a low cross-correlation level, given that the transmission frequency shifting method is used to counter range wrap effect (this is discussed further below). In the case of Frank codes, one can relax some conditions such as the order of range wrap cancellation to obtain more codes while satisfying certain criteria such as range sidelobe level. For example, if the order of range wrap cancellation is equal to one, the minimum number of codes with close to zero cross correlation could be eight (i.e. a code length of eight).

Figure 4:
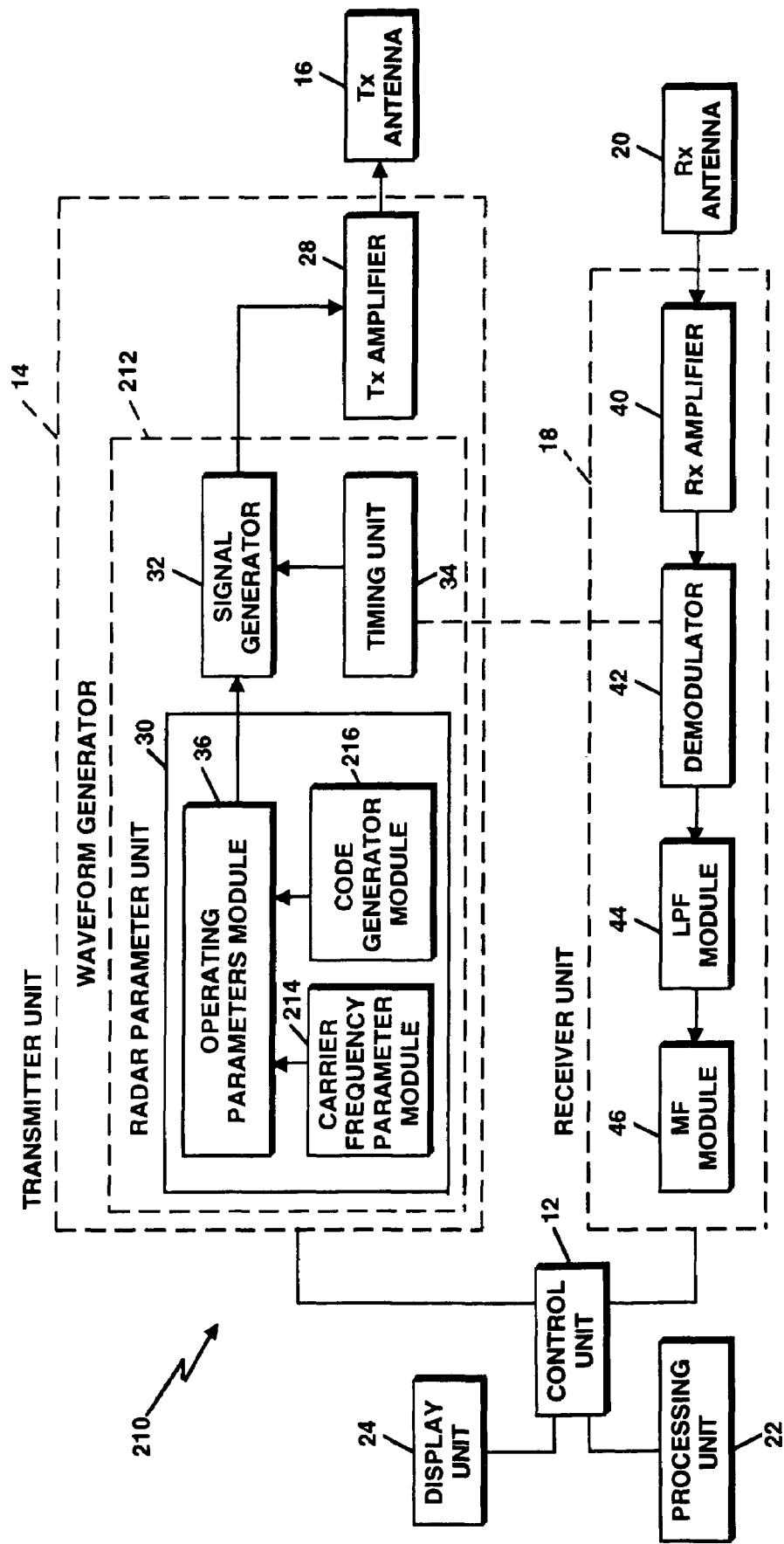

The inventors have also found that carrier frequency offset and complementary codes can be combined to increase the number of radar systems that can operate concurrently in a radar systems network on a common frequency. Referring now to FIG. 4, shown therein is an exemplary block diagram of a radar system 210 having a waveform generator 212 that generates both carrier frequency offset and complementary codes for concurrent operation with at least one other radar system on a common frequency in accordance with the invention. In this embodiment, the waveform generator 212 includes both a carrier frequency parameter module 214 and a code generator module 216. The remainder of the components of the radar system 110 are similar to those of radar system 10 and will not be discussed.

The inventors have also found that it is possible to use a fast, dynamic assignment procedure, that operates in real-time, to provide each radar system in a radar systems network with a dynamic carrier frequency and/or dynamic complementary coded waveform (or a set of dynamic complementary coded waveforms). The dynamic assignment procedure uses a cost function that can be based on the number of radar systems in the radar systems network, the length of the complementary codes that are used as well as minimizing one or more of the correlation of transmitted radar pulses, the level of range-wrap, the level of mismatched filter output, and the level of range sidelobes in plots of radar data.

One possible implementation of a dynamic assignment procedure that combines carrier frequency offset and complementary code generation is set out as follows.

(1) Designate the maximum interference level at the output of the MF module 46 due to individual coded pulses from another radar system as Q dB with the assumption that power loss due to the distance between the two radar systems is included in a form of a weighting multiplier at the output of the MF module 46;

(2) If a noise suppression technique is used that depends on mismatched filters (see Applicant's co-pending U.S. patent application having Ser. No. 10/384,203 for an example), then designate the maximum interference level at the outputs of mis-matched filters due to individual coded pulses from another radar system as R dB with respect to the output of the MF module 46 with the assumption that power loss due to distance between the two radar systems is included in a form of weighting multiplier at the output of mis-matched filters;

(3) Specify the coded waveforms that can be used, the code length, the number of working radar systems, the operational strategy, and the environmental effects.

(4) Specify the range-wrap interference level to be less than S dB; and, (5) Feed the parameters from steps 1–4 into a dynamic cost function that will generate the frequency offset and coded waveform parameters for generating the pulses.

The carrier frequency offset and complementary codes can be dynamically changed in the event that one or more of the radar systems in the radar systems network come online or go offline. Further, the information about the radar locations is used to include an additional loss due to the wave traveling from one radar system to another radar system. In addition, there can be K complementary codes, from which a subset of M codes is selected that minimize the cost function. The complementary codes can be dynamically selected first by the code generator module and then the carrier frequency parameter module can select the frequency offsets for the radar systems that operate at the same time. The level of optimization can be determined from the structure and priority given to parameters that affect the performance of the radar systems network. For example, having a minimum cross correlation among codes can be the first priority that is satisfied before looking at other issues. The optimization process can be one-dimensional or multi-dimensional based on the status and importance of parameters that form the cost function.

As mentioned previously, there are two modes of radar system network operation: collaborative and non-collaborative. In collaborative operation, a network control unit can be used to coordinate the operation of the multiple radar systems. In this case, the network of radar systems can be operating in one country. The network control unit can provide each radar system with information regarding a carrier frequency offset, a set of complementary codes and other operational parameters (the amount of information that is provided depends on which embodiment of the radar system 10, 110 and 210 is used. This information can be in a high level format and so that the exact information is not provided but rather each radar system uses the information as a guideline for implementing and managing their own radar operational parameters. In this case, the optimization method discussed above for selecting complementary codes and carrier frequency offsets can also be performed by the network control unit.

In non-collaborative operation, the radar systems can be operating in different countries and are therefore somewhat independent from one another. Nonetheless, due to the long range of some radar systems, especially HFSWR for example, there is interference between the radar systems when they operate concurrently on a common frequency. In this case, the radar systems can come with a pre-assigned carrier frequency offset and or set of complementary codes. Once again, the particular implementation depends on which embodiment of the radar system 10, 110 and 210 is used.

In a further alternative for either the collaborative or non-collaborative case, the radar systems may communicate with each other to indicate which carrier frequency offset is being used and/or which set of complementary codes is being used.

The inventors have also realized that the usage of carrier frequency offset for allowing multiple radar systems in a radar systems network to operate in a concurrent fashion on a common frequency can also be used to combat range-wrap. In this case, a radar system such as radar system 10 with carrier frequency parameter module 36 can be used. However, the radar system operates in a different manner. Previously, to allow for the simultaneous operation of multiple radar systems, the carrier frequency parameter module 36 generates a carrier frequency offset $f_{off}$ that is always used when the radar system 100 is transmitting radar pulses. However, the carrier frequency parameter module 36 can be augmented such that it continuously varies the carrier frequency for the transmission of adjacent pulses in time. For example, the transmitter unit may cycle between four unique carrier frequencies. Accordingly, the subsequent reflected pulses will be separated in Doppler frequency and the receiver unit 18 is adapted such that it is tuned to the carrier frequency that was used to transmit the previous pulse. In this case, reflected pulses due to range-wrap will not affect the radar data for a current reflected pulse because the range-wrap reflected pulse will be shifted in Doppler frequency in a similar fashion shown in FIG. 2c. In this case, a guard band can be used and the frequency offset can be similar to that discussed for the case of concurrent operation of multiple radar systems on a common frequency. However, in this case, there is only one radar system that is operating at a time. If more than one radar system is operating concurrently on a common frequency, then each radar system can use a unique set of complementary codes so that the radar data associated with a given radar system is orthogonal with respect to the radar data associated with the other radar systems in the radar network. Each radar system can then cycle through a set of carrier frequencies with only a relatively small difference in frequency on the order of tens of Hertz (although the "true" carrier frequencies and radar systems bandwidths stay the same) for transmitting radar pulses with each pulse receiving a unique carrier frequency with respect to an adjacent pulse in time. The same set of carrier frequencies may be used by each radar system. Alternatively, unique sets of carrier frequencies may be used. In this case, a radar system similar to radar system 210 can be used with a variation in operation as just described.

The usage of carrier frequency offset to combat range-wrap rather than complementary codes offers several advantages. Firstly, the radar system can use any type of pulse; i.e. the pulse can be uncoded or coded. Secondly, if a coded pulse is used, then different codes can be used rather than a complementary code. This is beneficial since other codes have advantages in certain situations as is well known by those skilled in the art. In addition, the fact that complementary codes do not have to be used to combat range-wrap when carrier frequency offset is used is beneficial since, at times, it can be difficult to properly align the phase information in the reflected pulses due to the environmental and target Doppler effects on the received complementary codes (i.e. for processing data in a CIT). In other cases it may be hard to use complementary codes that have zero cross-correlation.

The elements of the radar systems 10, 110 and 310 described herein may be implemented through any suitable means known in the art although the use of dedicated hardware such as a digital signal processor with appropriate software components may be preferable. In addition, discrete components such as filters, comparators, multipliers, shift registers, memory and the like may also be used. Furthermore, certain components of the radar systems 10, 110 and 210 may be implemented by the same structure. For instance, the processing unit 22, the LPF module 44 and the MF module 46 may be implemented by the same structure having components that allow for varying operating parameters.

The elements of the radar systems 10, 110 and 210 that are implemented via software may be written in Matlab, C, C++, Labview™ or any other suitable programming language embodied in a computer readable medium on a computing platform having an operating system and the associated hardware and software that is necessary to implement the radar systems 10, 110 and 210. The computer programs may comprise modules or classes, as is known to those skilled in object oriented programming. Separate software modules may be designed for some of the components of the radar system 10, 110 and 210. Alternatively, the functionality of some of these components may be combined into a smaller number of software modules where appropriate such as the radar parameter unit 30 and its internal components.

It should be understood that the term common frequency means a frequency at which multiple radar systems transmit radar pulses. For example, for a conventional system of HFSW radar systems, the radars may operate concurrently at a common frequency of 3 MHz in which case there is cross-talk. However, in accordance with the invention, concurrent operation on a common frequency means that with a relatively small shift in carrier frequency, one is able to operate multiple radar systems concurrently without incurring any cross-talk.

It should also be understood that various modifications can be made to the embodiments described and illustrated herein, without departing from the invention, the scope of which is defined in the appended claims.

What is claimed is:

1. A waveform generator for a radar system, the waveform generator being adapted to allow the radar system to operate concurrently on a common frequency with at least one other radar system, the waveform generator comprising:
   a. a radar parameter unit including:
      i) an operating parameters module for generating operating parameters for radar pulses that are transmitted by the radar system; and,
      ii) a carrier frequency parameter module connected to the operating parameters module for generating a carrier frequency at which the radar pulses are transmitted, the carrier frequency including a carrier frequency offset with respect to carrier frequencies used by the at least one other radar system;
   b. a signal generator connected to the radar parameter unit for generating the radar pulses in accordance with the operating parameters; and,
   c. a timing unit connected to the signal generator for supplying a pulse trigger signal to the signal generator for generating the radar pulses such that the radar system is synchronized with the at least one other radar system.

2. The waveform generator of claim 1, wherein the carrier frequency offset includes a guard band for ensuring that radar data associated with the radar system is separated from radar data associated with the at least one other radar system.

3. The waveform generator of claim 1, wherein the radar system is a High Frequency Surface Wave Radar, and the carrier frequency offset is at least 10 Hz.

4. The waveform generator of claim 1, wherein the radar parameter unit further includes a code generator module connected to the operating parameters module for providing at least one complementary code that is used to generate the radar pulses, the at least one complementary code being orthogonal to complementary codes used by the at least one other radar system.

5. The waveform generator of claim 4, wherein the complementary codes include Frank codes.

6. A waveform generator for a radar system, the waveform generator being adapted to allow the radar system to operate concurrently on a common frequency with at least one other radar system, the waveform generator comprising:
   a. a radar parameter unit including:
      i) an operating parameters module for generating operating parameters for radar pulses that are transmitted by the radar system; and,
      ii) a code generator module connected to the operating parameters module for providing at least one complementary code that is used to generate the radar pulses, the at least one complementary code being orthogonal to complementary codes used by the at least one other radar system;

b. a signal generator connected to the radar parameter unit for generating the radar pulses in accordance with the operating parameters; and, c. a timing unit connected to the signal generator for supplying a pulse trigger signal to the signal generator for generating the radar pulses such that the radar system is synchronized with the at least one other radar system.

7. The waveform generator of claim 6, wherein the complementary codes include Frank codes.

8. The waveform generator of claim 6, wherein the radar parameter unit further includes a carrier frequency parameter module connected to the operating parameters module for generating a carrier frequency at which the radar pulses are transmitted, the carrier frequency including a carrier frequency offset with respect to carrier frequencies used by the at least one other radar system.

9. The waveform generator of claim 8, wherein the carrier frequency offset includes a guard band for ensuring that radar data associated with the radar system is separated from radar data associated with the at least one other radar system.

10. The waveform generator of claim 8, wherein the radar system is a High Frequency Surface Wave Radar, and the carrier frequency offset is at least 10 Hz.

11. A waveform generator for a radar system, the waveform generator being adapted to allow the radar system to operate concurrently on a common frequency with at least one other radar system, the waveform generator comprising:

a. a radar parameter unit including:
  i) an operating parameters module for generating operating parameters for radar pulses that are transmitted by the radar system;
  ii) a carrier frequency parameter module connected to the operating parameters module for generating a carrier frequency at which the radar pulses are transmitted, the carrier frequency including a carrier frequency offset with respect to carrier frequencies used by the at least one other radar system; and,
  iii) a code generator module connected to the operating parameters module for providing at least one complementary code that is used to generate the radar pulses, the at least one complementary code being orthogonal to complementary codes used by the at least one other radar system;

b. a signal generator connected to the radar parameter unit for generating the radar pulses in accordance with the operating parameters; and, c. a timing unit connected to the signal generator for supplying a pulse trigger signal to the signal generator for generating the radar pulses such that the radar system is synchronized with the at least one other radar system.

12. The waveform generator of claim 11, wherein the carrier frequency offset includes a guard band for ensuring that radar data associated with the radar system is separated from radar data associated with the at least one other radar system.

13. The waveform generator of claim 11, wherein the radar system is a High Frequency Surface Wave Radar, and the carrier frequency offset is at least 10 Hz.

14. The waveform generator of claim 11, wherein the complementary codes include Frank codes.

15. A waveform generator for a radar system, the waveform generator being adapted to combat range wrap, the waveform generator comprising:

a. a radar parameter unit including:
  i) an operating parameters module for generating operating parameters for radar pulses that are transmitted by the radar system; and,
  ii) a carrier frequency parameter module connected to the operating parameters module for generating a set of carrier frequencies at which the radar pulses are transmitted, the set of carrier frequencies including unique carrier frequencies each having a carrier frequency offset with respect to one another;

b. a signal generator connected to the radar parameter unit for generating radar pulses in accordance with the operating parameters with adjacent radar pulses being given a unique carrier frequency from the set of carrier frequencies; and, c. a timing unit connected to the signal generator for supplying a pulse trigger signal to the signal generator for generating the radar pulses.

16. The waveform generator of claim 15, wherein the carrier frequency offsets used for the set of carrier frequencies include a guard band for ensuring that radar data associated with one radar pulse is separated from radar data associated with an adjacent radar pulse.

17. The waveform generator of claim 15, wherein the radar system is a High Frequency Surface Wave Radar, and the carrier frequency offset is at least 10 Hz.

18. The waveform generator of claim 15, wherein the radar parameter unit further includes a code generator module connected to the operating parameters module for providing at least one complementary code that is used to generate the radar pulses, the at least one complementary code being orthogonal to complementary codes used by at least one other radar system thereby allowing for concurrent operation of the radar systems on a common frequency.

19. The waveform generator of claim 18, wherein the complementary codes include Frank codes.

20. The waveform generator of claim 18, wherein the complementary codes include Barker codes.

21. A method for generating radar pulses for a radar system for allowing the radar system to operate concurrently with at least one other radar system on a common frequency, the method comprising:

a. generating operating parameters for radar pulses that are transmitted by the radar system, the operating parameters including a carrier frequency at which the radar pulses are transmitted, the carrier frequency including a carrier frequency offset with respect to carrier frequencies used by the at least one other radar system;

b) generating a pulse trigger signal for synchronizing the radar system with the at least one other radar system; and, c) generating the radar pulses in accordance with the operating parameters and the synchronization provided by the pulse trigger signal.

22. The method of claim 21, wherein generating the carrier frequency offset includes adding a guard band for ensuring that radar data associated with the radar system is separated from radar data associated with the at least one other radar system.

23. The method of claim 21, wherein the method further includes:

d) generating at least one complementary code that is used to generate the radar pulses, the at least one complementary code being orthogonal to complementary codes used by the at least one other radar system.

24. The method of claim 23, wherein the complementary codes include Frank codes.

25. A method for generating radar pulses for a radar system for allowing the radar system to operate concurrently with at least one other radar system on a common frequency, the method comprising:
   a. generating operating parameters for radar pulses that are transmitted by the radar system;
   b. generating at least one complementary code that is used to generate the radar pulses, the at least one complementary code being orthogonal to complementary codes used by the at least one other radar system;
   c. generating a pulse trigger signal for synchronizing the radar system with the at least one other radar system; and,
   d. generating the radar pulses in accordance with the operating parameters and the synchronization provided by the pulse trigger signal.

26. The method of claim 25, wherein the complementary codes include Frank codes.

27. The method of claim 25, wherein the operating parameters include a carrier frequency at which the radar pulses are transmitted, and the method further includes generating the carrier frequency with a carrier frequency offset with respect to carrier frequencies used by the at least one other radar system.

28. The method of claim 27, wherein generating the carrier frequency offset includes adding a guard band for ensuring that radar data associated with the radar system is separated from radar data associated with the at least one other radar system.

29. A method for generating radar pulses for a radar system for allowing the radar system to operate concurrently with at least one other radar system on a common frequency, the method comprising:
   a. generating operating parameters for radar pulses that are transmitted by the radar system, the operating parameters including a carrier frequency at which the radar pulses are transmitted, the carrier frequency including a carrier frequency offset with respect to carrier frequencies used by the at least one other radar system;
   b. generating at least one complementary code that is used to generate the radar pulses, the at least one complementary code being orthogonal to complementary codes used by the at least one other radar system;
   c. generating a pulse trigger signal for synchronizing the radar system with the at least one other radar system; and,
   d. generating the radar pulses in accordance with the operating parameters and the synchronization provided by the pulse trigger signal.

30. The method of claim 29, wherein generating the carrier frequency offset includes adding a guard band for ensuring that radar data associated with the radar system is separated from radar data associated with the at least one other radar system.

31. The method of claim 29, wherein the complementary codes include Frank codes.

32. A method of generating radar pulses for a radar system, the radar pulses being adapted to combat range wrap, the method comprising:
   a. generating operating parameters for the radar pulses that are transmitted by the radar system, the operating parameters including a set of carrier frequencies at which the radar pulses are transmitted, the set of carrier frequencies including unique carrier frequencies each having a carrier frequency offset with respect to one another, with adjacent radar pulses being given a unique carrier frequency from the set of carrier frequencies;
   b. generating a pulse trigger signal for synchronizing the radar system with the at least one other radar system; and,
   c. generating the radar pulses in accordance with the operating parameters and the synchronization provided by the pulse trigger signal.

33. The method of claim 32, wherein the method includes generating the carrier frequency offsets with a guard band for ensuring that radar data associated with one radar pulse is separated from radar data associated with an adjacent radar pulse.

34. The method of claim 32, wherein the method further includes providing at least one complementary code that is used to generate the radar pulses, the at least one complementary code being orthogonal to complementary codes used by at least one other radar system thereby allowing for concurrent operation of the radar systems on a common frequency.

35. The method of claim 34, wherein the complementary codes include at least one of Frank codes and Barker codes.

* * * * *

UNITED STATES PATENT AND TRADEMARK OFFICE
CERTIFICATE OF CORRECTION

| | | |
|---|---|---|
| PATENT NO. | : 7,151,483 B2 | Page 1 of 2 |
| APPLICATION NO. | : 11/051402 | |
| DATED | : December 19, 2006 | |
| INVENTOR(S) | : Reza M. Dizaji et al. | |

It is certified that error appears in the above-identified patent and that said Letters Patent is hereby corrected as shown below:

On the Title Page Item -73-, Assignee delete "Raytheon Company, Waltham, MA (US)" and replace with --Raytheon Canada Limited, Ottawa, Ontario (CA)--.

Column 1, line 7 delete "APPLICATION" and replace with --APPLICATIONS--.

Column 1, line 11 delete "incorporated hereby" and replace with --incorporated herein--.

Column 1, line 25 delete "and an receiving" and replace with --and a receiving--.

Column 8, line 66 delete "mean" and replace with --meant--.

Column 10, line 31 delete "tacking" and replace with --tracking--.

Column 10, line 61 delete "$P_{TR12}$" and replace with --$P_{TR21}$--.

Column 11, line 32 delete "multiple radar system)," and replace with --multiple radar systems),--.

Column 14, line 14 delete "side lobe" and replace with --sidelobe--.

Column 14, line 23 delete second occurrence of "be".

Column 14, line 24 delete "cancellaltion" and replace with --cancellation--.

Column 15, line 8 delete "cross correlation" and replace with --cross-correlation--.

Column 16, line 12 delete "cross correlation" and replace with --cross-correlation--.

Column 16, line 28 delete "format and so that" and replace with --format so that--.

UNITED STATES PATENT AND TRADEMARK OFFICE
CERTIFICATE OF CORRECTION

PATENT NO. : 7,151,483 B2
APPLICATION NO. : 11/051402
DATED : December 19, 2006
INVENTOR(S) : Reza M. Dizaji et al.

It is certified that error appears in the above-identified patent and that said Letters Patent is hereby corrected as shown below:

Column 16, line 42 delete "and or" and replace with --and/or--.

Column 18, line 3 delete "term common frequency" and replace with --term "common frequency"--.

Column 18, line 6 delete "HFSW" and replace with --HFSWR--.

Signed and Sealed this

Twenty Second Day of April, 2008

JON W. DUDAS
*Director of the United States Patent and Trademark Office*